United States Patent [19]

Takaba et al.

[11] Patent Number: 5,465,613
[45] Date of Patent: Nov. 14, 1995

[54] SELF-DIAGNOSING APPARATUS FOR MOTOR VEHICLES

[75] Inventors: Katsumi Takaba, Obu; Shuichi Fujisawa, Kariya, both of Japan

[73] Assignee: Nippondenso Co., Ltd., Kariya, Japan

[21] Appl. No.: 211,634

[22] PCT Filed: Jul. 22, 1993

[86] PCT No.: PCT/JP93/01025

§ 371 Date: Apr. 8, 1994

§ 102(e) Date: Apr. 8, 1994

[87] PCT Pub. No.: WO94/04808

PCT Pub. Date: Mar. 3, 1994

[30] Foreign Application Priority Data

Aug. 11, 1992 [JP] Japan .................................. 4-235349

[51] Int. Cl.⁶ .................................................. G01M 15/00
[52] U.S. Cl. ........................................... 73/117.3; 340/438
[58] Field of Search ............................ 73/117.3; 340/459, 340/438

[56] References Cited

U.S. PATENT DOCUMENTS

| | | | |
|---|---|---|---|
| 4,277,772 | 7/1981 | Kastura et al. | 340/459 |
| 4,780,826 | 10/1988 | Nakano et al. | 73/117.3 |
| 5,035,226 | 7/1991 | Nishikawa et al. | 73/117.3 |
| 5,111,686 | 5/1992 | Kamiya et al. | 340/438 |
| 5,132,920 | 7/1992 | Bellows et al. | 364/551.01 |
| 5,207,091 | 5/1993 | Shibata et al. | 73/117.3 |
| 5,276,619 | 1/1994 | Ohara et al. | 364/424.04 |

FOREIGN PATENT DOCUMENTS

| | | |
|---|---|---|
| 072000 | 2/1983 | European Pat. Off. . |
| 397476 | 11/1990 | European Pat. Off. . |
| 57-86544 | 5/1982 | Japan . |
| 58-26649 | 2/1983 | Japan . |
| 62-3312 | 1/1987 | Japan . |
| 62-142849 | 6/1987 | Japan . |
| 63-90738 | 4/1988 | Japan . |

Primary Examiner—Richard Chilcot
Assistant Examiner—Max H. Noori
Attorney, Agent, or Firm—Cushman, Darby & Cushman

[57] ABSTRACT

A self-diagnosing apparatus for a vehicles capable of reliably storing diagnostic data on high priority malfunctions. A control unit comprises a CPU and a RAM for storing stores contents even when an ignition key is turned off. The self-diagnosing apparatus detects a plurality of malfunctions. The plurality of malfunctions are classified into high priority malfunctions and low priority malfunctions. The RAM has a plurality of storage areas including a first frame and a second frame, the first frame being made to correspond to high priority malfunctions and the second frame to low priority malfunctions. The CPU inputs diagnostic data from each section of the motor vehicle necessary for analyzing instrument malfunctions and updates the stored contents of each area of the first and second frames. When the CPU detects an instrument malfunction, it sets a malfunction code at the beginning area of the frame corresponding to the priority at which the instrument malfunction is classified, and inhibits subsequent updating of the stored contents. Therefore, diagnostic data is stored for each priority.

13 Claims, 10 Drawing Sheets

FIG. 7

| RAM ADDRESS | FRAME 1 | RAM ADDRESS | FRAME 2 |
|---|---|---|---|
| 10 | MALFUNCTION CODE | 20 | MALFUNCTION CODE |
| 11 | NUMBER OF ROTATIONS OF ENGINE | 21 | NUMBER OF ROTATIONS OF ENGINE |
| 12 | WATER TEMPERATURE OF ENGINE | 22 | WATER TEMPERATURE OF ENGINE |
| 13 | THROTTLE OPENING | 23 | THROTTLE OPENING |
| 14 | RATE OF FLUCTUATION OF ENGINE SPEED | 24 | RATE OF FLUCTUATION OF ENGINE SPEED |
| 15 | NUMBER OF IGNITIONS DURING TRIP | 25 | SWITCH INPUT STATE |
| 16 | NUMBER OF MISFIRES DURING TRIP | 26 | VEHICLE SPEED |
| 17 | AIR-FUEL RATIO LEARNING VALUE | 27 | ENGINE LOAD |

SELF-DIAGNOSING APPARATUS FOR MOTOR VEHICLES

TECHNICAL FIELD

The present invention relates to a self-diagnosing apparatus for motor vehicles which stores diagnostic data necessary for analyzing malfunctions of instruments installed in such a motor vehicle.

BACKGROUND ART

At the present time, the construction of motor vehicles has become remarkably electronic. Instruments, including, among other things, the engine, installed in each section of a motor vehicle are interconnected to each other via a control computer so that complex operations can be performed.

In such case, even if a malfunction of a certain single installed instrument is detected, often the true cause for the malfunction, including the interrelation with other installed instruments, cannot be determined unless a wide range of data (diagnostic data) indicating the state of the motor vehicle at the time the malfunction is detected is collected. Also, after a temporary malfunction, there is a possibility that the malfunction will be corrected naturally. Further, often this is a sign that a complete failure will occur; however, it is quite difficult to find the cause thereof by performing an inspection after getting out of the motor vehicle.

Accordingly, a self-diagnosing apparatus is disclosed in Japanese Patent Laid-Open Nos. 62-142849 and 63-90738, in which diagnostic data from each section of a motor vehicle is updated and stored in a memory where the contents are stored at specified intervals even when the power supply is shut down; updating of the contents of the memory being inhibited (frozen) after a malfunction of an installed instrument is detected, so that diagnostic data at the time the malfunction is detected will be stored and the cause of the malfunction can be determined accurately after getting out of the motor vehicle.

Not all malfunctions of the installed instruments in a motor vehicle have the same priority. For example, malfunctions such as a misfire in the engine, a malfunction of the fuel system and the like are serious malfunctions, as such have a higher priority than malfunctions. Therefore, even if other malfunctions having respectively lower priorities have occured earlier, when a malfunction having a higher priority occurs, thereafter, diagnostic data obtained at the time of the higher priority malfunction must be held in precedence over other data related to the lower priority malfunction.

However, in the above-described conventional apparatus, when diagnostic data is frozen once when a malfunction of the apparatus occurs, such diagnostic data is not updated even when a malfunction having a priority higher than that of the above one occurs thereafter.

Therefore, when a malfunction having a high priority is detected, it is conceivable that the diagnostic data is replaced forcibly. However, if an ignition switch is turned off while this data is being replaced, a portion of the data which has not yet been replaced remains in a part of the memory and, on the contrary, erroneous diagnostic data is given, which is problematical. It is conceivable provide a main relay for supplying power for some time after the ignition switch has been turned off. However, such construction results in the hardware becoming overly complex.

The present invention solves the above-described problems of the prior art. It is an object of the present invention to provide a self-diagnosing apparatus for motor vehicles which is capable of reliably storing diagnostic data on high priority malfunctions.

DISCLOSURE OF THE INVENTION

The construction of the present invention will be explained with reference to FIG. 10. The present invention comprises diagnostic data detecting means for detecting diagnostic data necessary for analyzing malfunctions of instruments installed in a motor vehicle; storing means for storing a plurality of storage areas disposed so as to respectively correspond to priorities of the malfunctions of the instruments installed in a motor vehicle so that diagnostic data detected by the data detecting means is up-dated and stored as desired for each of the storage areas, and the stored contents thereof are held even when the ignition switch is in a turned off state; malfunction detecting means for detecting malfunctions of the instruments installed in the motor vehicle; inhibiting means for inhibiting the updating and storing of the diagnostic data corresponding to the priority of the malfunction in the storage area of the storing means; and diagnostic data output means for outputting the contents of the storing means from the storage areas respectively corresponding to priorities of the malfunctions.

In the above-described construction, storage areas, the number of which corresponds to the number of the priorities of the instrument malfunctions, are provided. Therefore, even if an instrument malfunction with a low priority is detected and diagnostic data relating to this malfunction is frozen, since diagnostic data of the storing means corresponding to the instrument malfunction with a high priority is not frozen, the updating of the diagnostic data relating to the malfunction with a low priority is continued. When, thereafter, an instrument malfunction with a high priority is detected, diagnostic data relating to this malfunction is frozen and held.

Because an operation for replacing diagnostic data on an instrument malfunction having a high priority with diagnostic data on an instrument malfunction having a low priority is unnecessary, situations in which diagnostic data on an instrument malfunction having a low priority remains in a portion of the diagnostic data as a result of an ignition switch being turned off during the above replacing operation, do not occur.

As described above, according to the self-diagnosing apparatus of the present invention, it is possible to reliably store diagnostic data for analyzing a serious instrument malfunction with a high priority.

BRIEF DESCRIPTION OF THE DRAWINGS

FIG. 7 is an illustration of the memory configuration;

DESCRIPTION OF THE PRESENTLY PREFERRED EMBODIMENTS OF THE INVENTION

Figure 1:
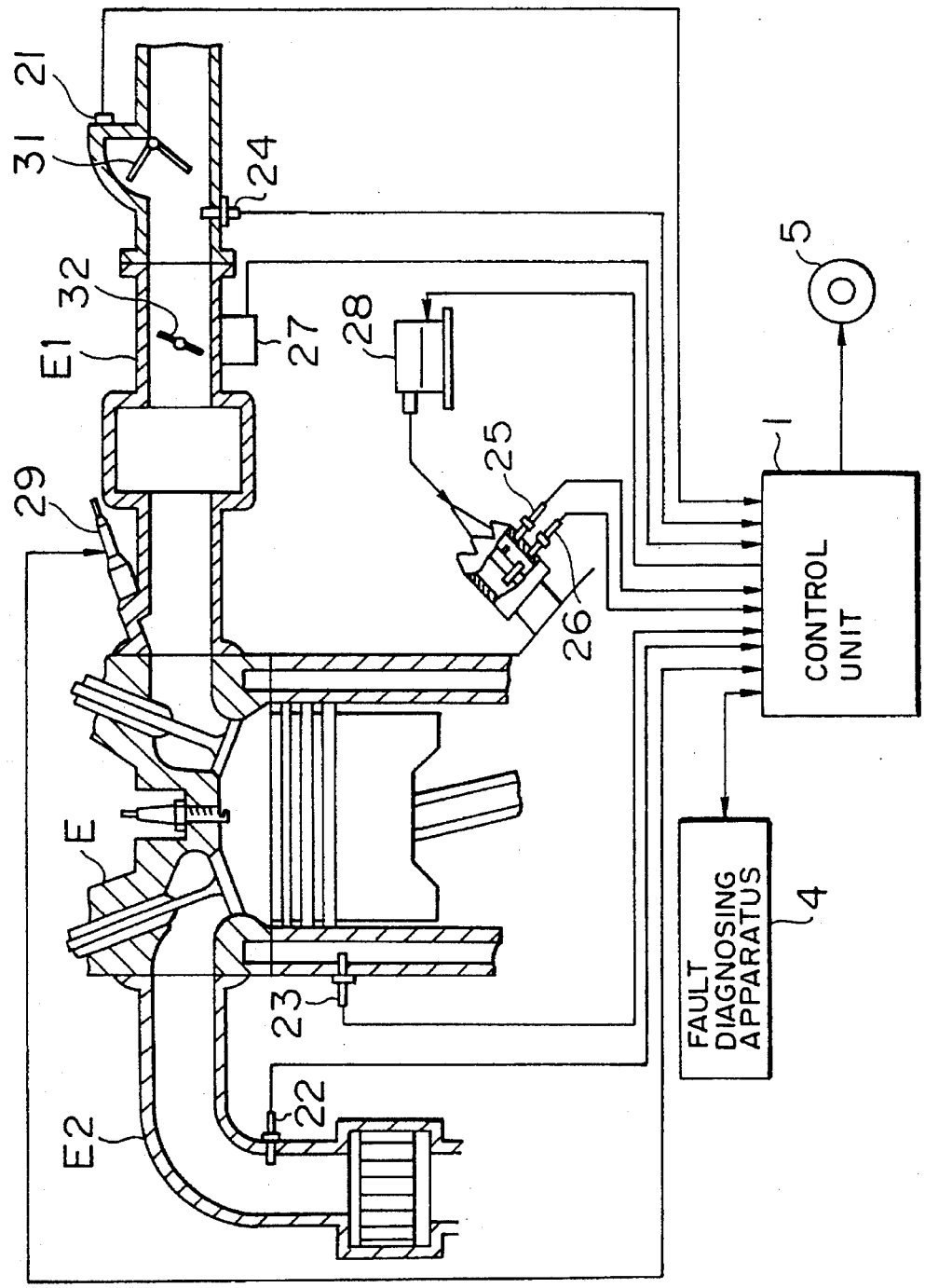
FIG. 1 is an illustration of the entire construction of the self-diagnosing apparatus.
Figure 2:
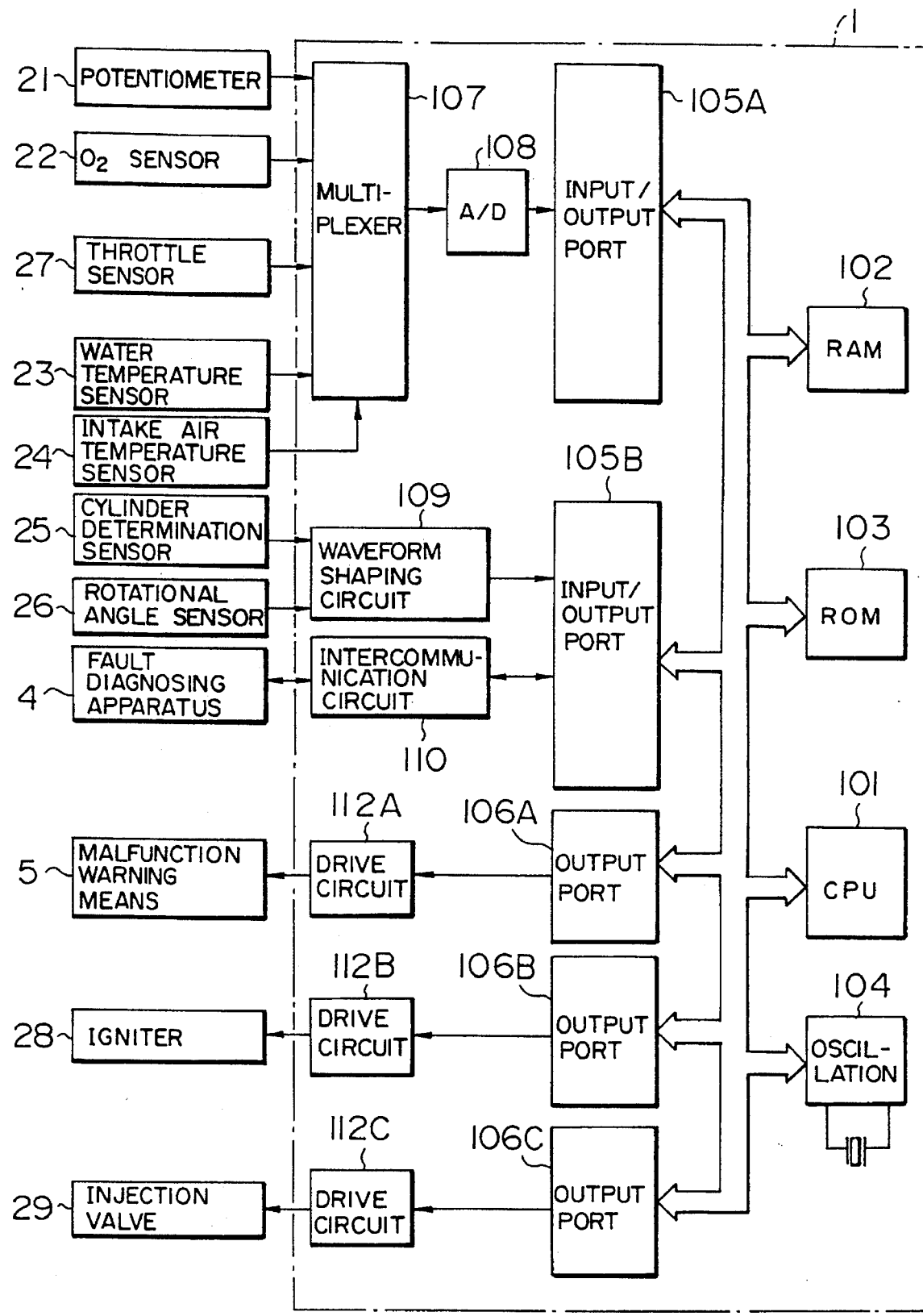
FIG. 2 is a block diagram of the control unit.

In FIGS. 1 and 2, a potentiometer 21 of a flow meter 31, an intake-air temperature sensor 24, a throttle sensor 27 of a throttle valve 32, and a fuel discharge valve 29 are disposed in the upstream portion of an intake-air pipe E1 of an engine E. A water temperature sensor 23 is disposed in a water jacket of the engine E, and an O2 sensor 22 is disposed in a discharge pipe E2 of the engine E.

A control unit 1 having a CPU 101 contained therein is connected via a data bus to a RAM 102, a ROM 103, an oscillation circuit 104, input/output ports 105A and 105B, and output ports 106A, 106B, and 106C. The RAM 102 is separated into a common RAM for temporary storage and a standby RAM in which the contents at the time the ignition key is turned off are held.

Output signals from the potentiometer 21, the O2 sensor 22, the water temperature sensor 23, the intake-air temperature sensor 24 and the throttle sensor 27 are input through a multiplexer 107 and an A/D converter 108 to the input/output port 105A. Output signals from a cylinder determination sensor 25 and a rotational angle sensor 26 are input through a waveform shaping circuit 109 to the input/output port 105B.

The output signals are supplied via output ports 106B and 106C to an igniter 28 and the fuel discharge valve 29.

When a malfunction of each of the above-mentioned instruments installed in a motor vehicle is detected by a sequence to be described later, an output signal is issued to a malfunction warning means 5 through the output port 106A and a drive circuit 112A. As will be described later, diagnostic data necessary for analyzing instrument malfunctions are exchanged via the input/output port 105B and an intercommunication circuit 110 with a fault diagnosing apparatus 4.

Figure 3:
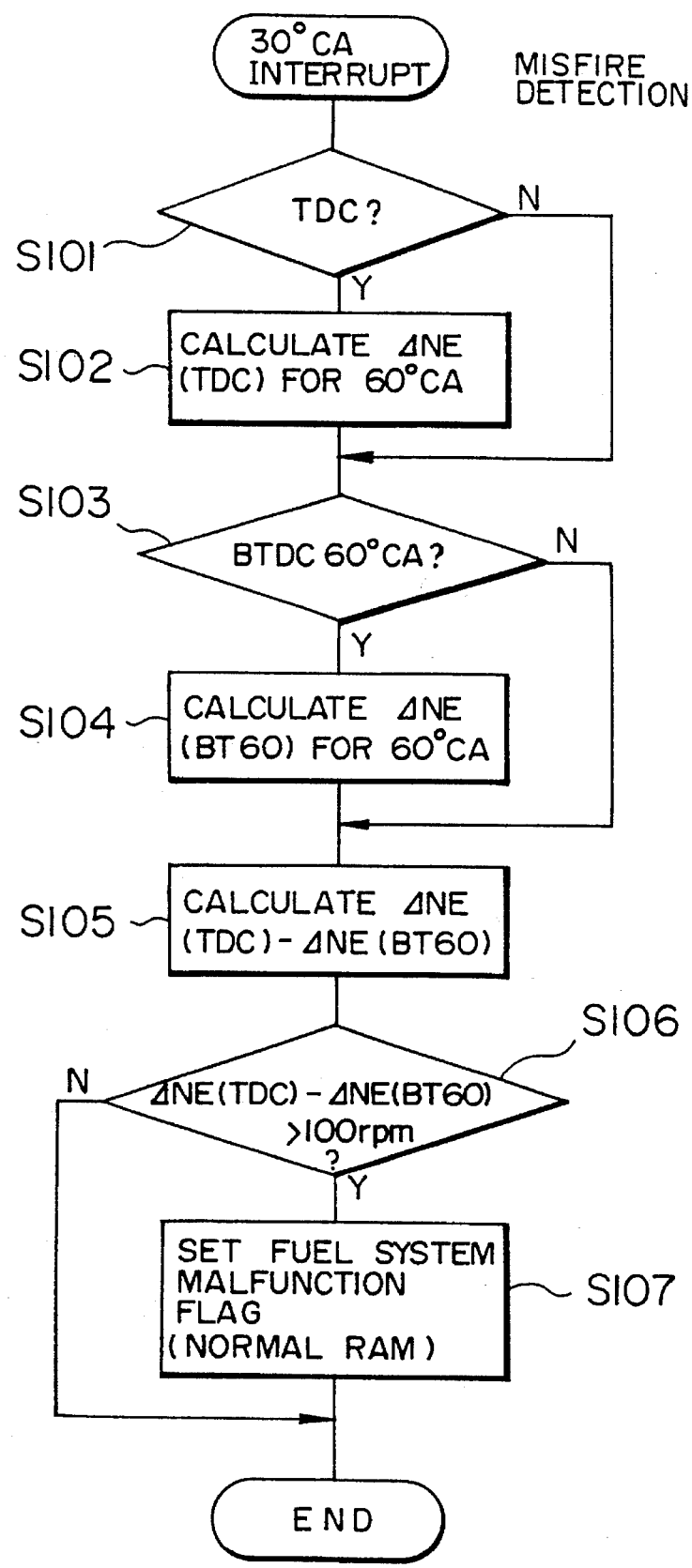
FIG. 3 is a program flowchart.

FIG. 3 shows a program for detecting a misfire malfunction. The program is activated at intervals of 30° crank angles (CA). When TDC is confirmed in step (hereinafter referred to as S) 101, the amount ΔNE (TDC) of variations in the number of rotations of the engine for the duration of 60° CA up to TDC is calculated in S102. Next, BTDC 60° is confirmed in S103. In S104, the amount ΔNE (BT60) of the fluctuation of the engine speed for the duration of 60° CA up to the present time is calculated.

In S105, the difference between ΔNE (TDC) and ΔNE (BT60) is calculated. When this difference exceeds 100 rpm, it is assumed that a misfire has occurred (S106), and a fail flag in the common RAM is set (S107).

Figure 4:
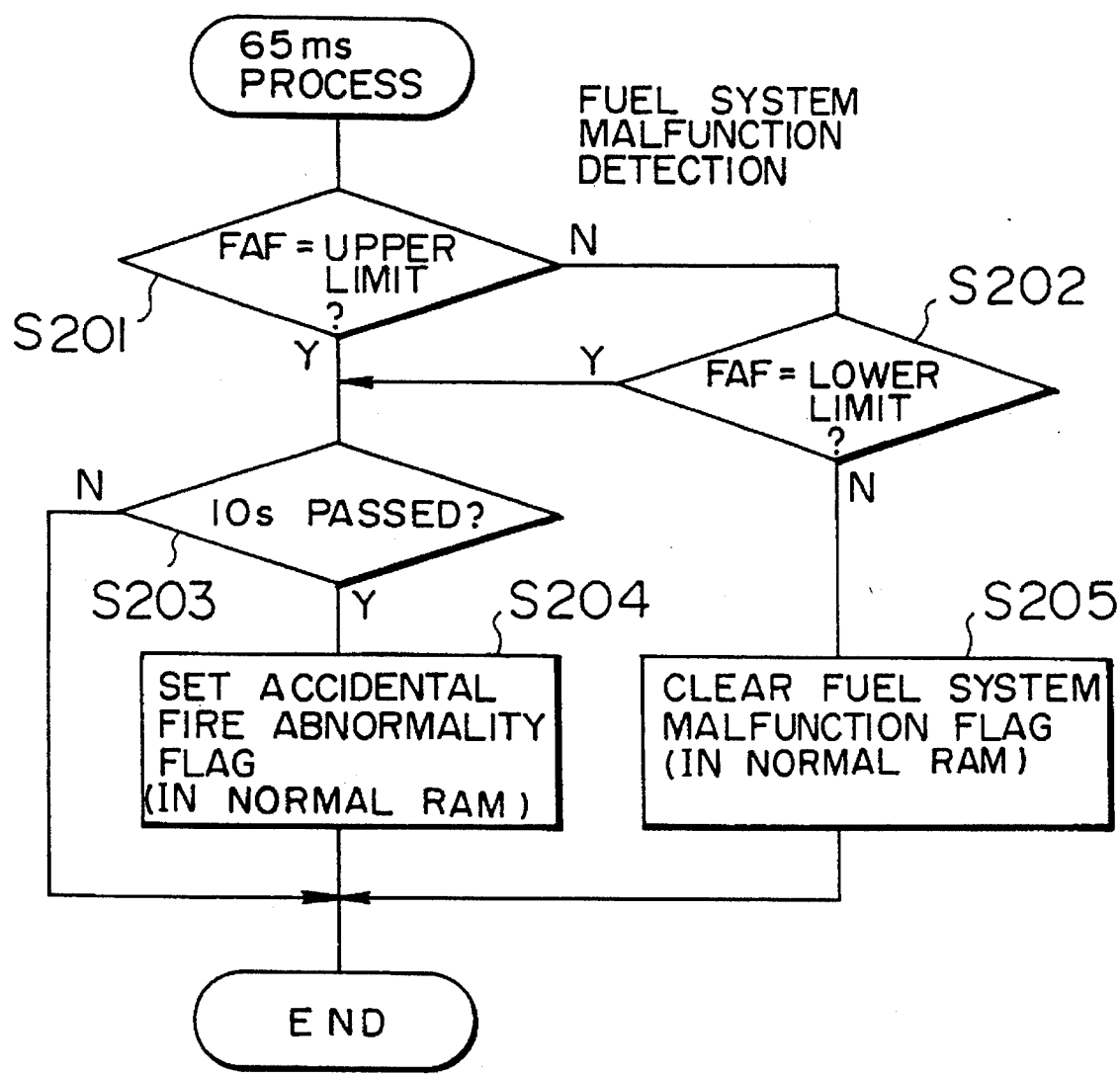
FIG. 4 is a program flowchart.

FIG. 4 shows a program for detecting a malfunction of the fuel system. The program is activated at intervals of every 65 ms. A check is made in S201 and S202 to determine whether a FAF has reached an upper limit and a lower limit, respectively. In the above program, FAF is an air-fuel ratio correction coefficient which can be obtained by integrating or skipping an output from the O2 sensor. When the state in which FAF is at the upper limit or lower limit continues for 10 s or more (S203), it is assumed that a malfunction has occurred in the fuel system, and the fail flag in the common RAM is set. In a case other than the above, the fail flag is cleared (S205).

Figure 5:
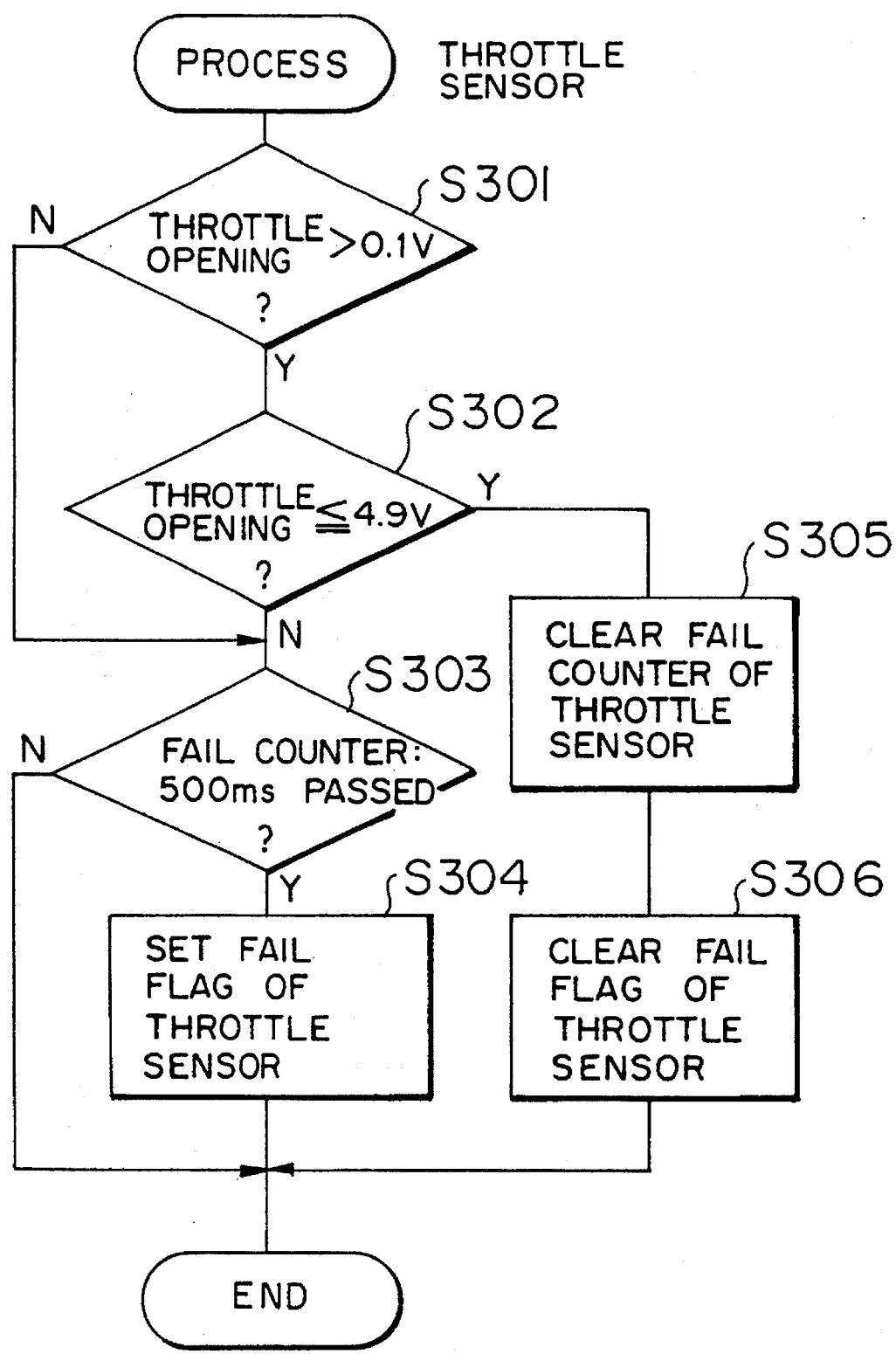
FIG. 5 is a program flowchart.

FIG. 5 shows a program for detecting a malfunction of the throttle sensor 27. In S301, a check is made to determine whether a throttle opening signal is in the range from 0.1 V to 4.9 V (S301, S302). If the signal is in this range, the fail counter is cleared, and the fail flag in the common RAM is cleared (S305, S306). If, on the other hand, the time during which the signal is not present in the above-mentioned range exceeds 500 ms (S303), it is assumed that the throttle sensor has a malfunction, and the fail flag is set (S304).

Figure 6:
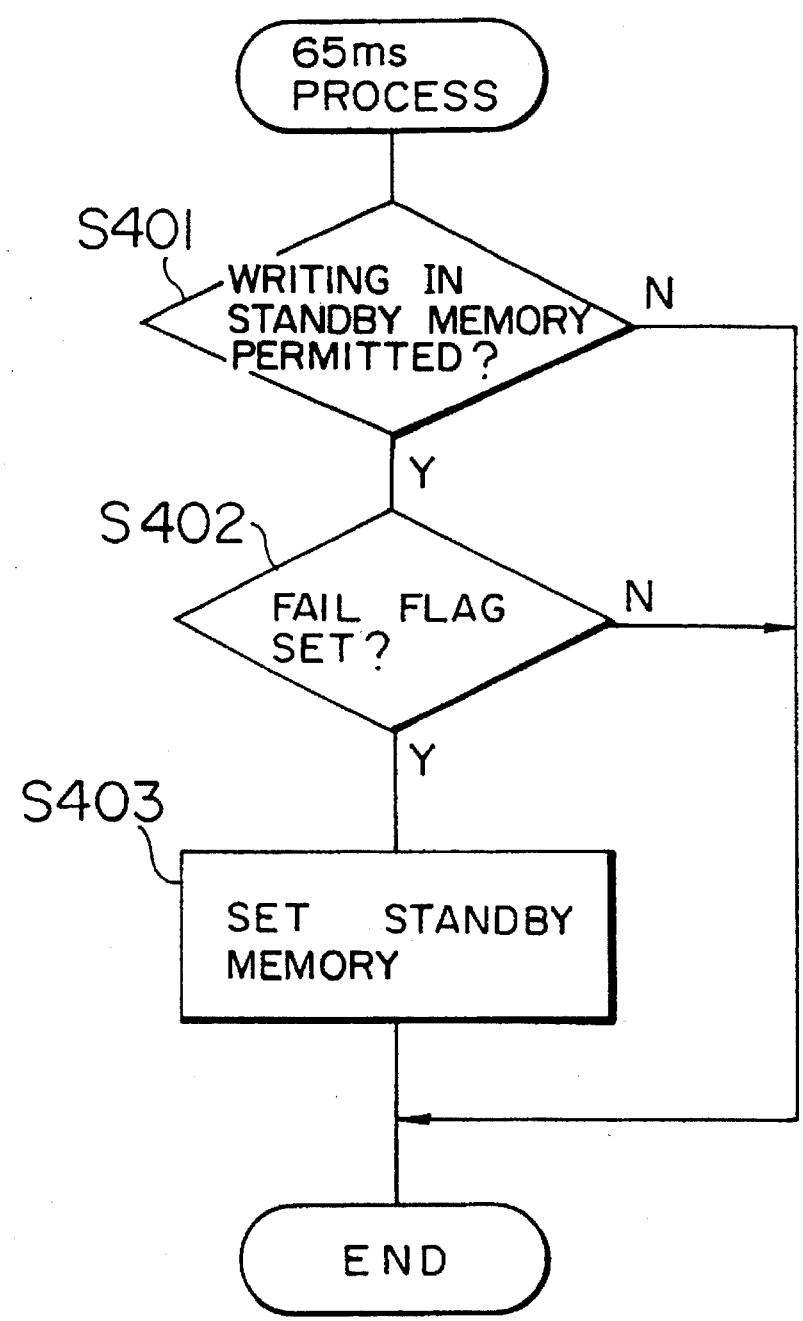
FIG. 6 is a program flowchart.

FIG. 6 shows a program for inputting into the standby RAM the fact that the above-mentioned fail flags are set, which is activated every 65 ms. In S401, a check is made to determine whether writing in the standby RAM is possible. When the fail flag has been set, predetermined bits of the standby RAM are set (S402, S403), so that the fact that a specific instrument malfunction has been detected is stored.

The diagnostic data storage areas of the standby RAM are shown in FIG. 7. In frame 1, starting at address 10, an area is allocated for storing various diagnostic data necessary for analyzing a high priority misfire and a high priority fuel system malfunction. In frame 2 starting at address 20, an area is allocated for storing various diagnostic data necessary for analyzing malfunctions having lower priority than the above misfire malfunction. A malfunction code indicating the type of the malfunction is set at the beginning address of each frame as described later.

Figure 8:
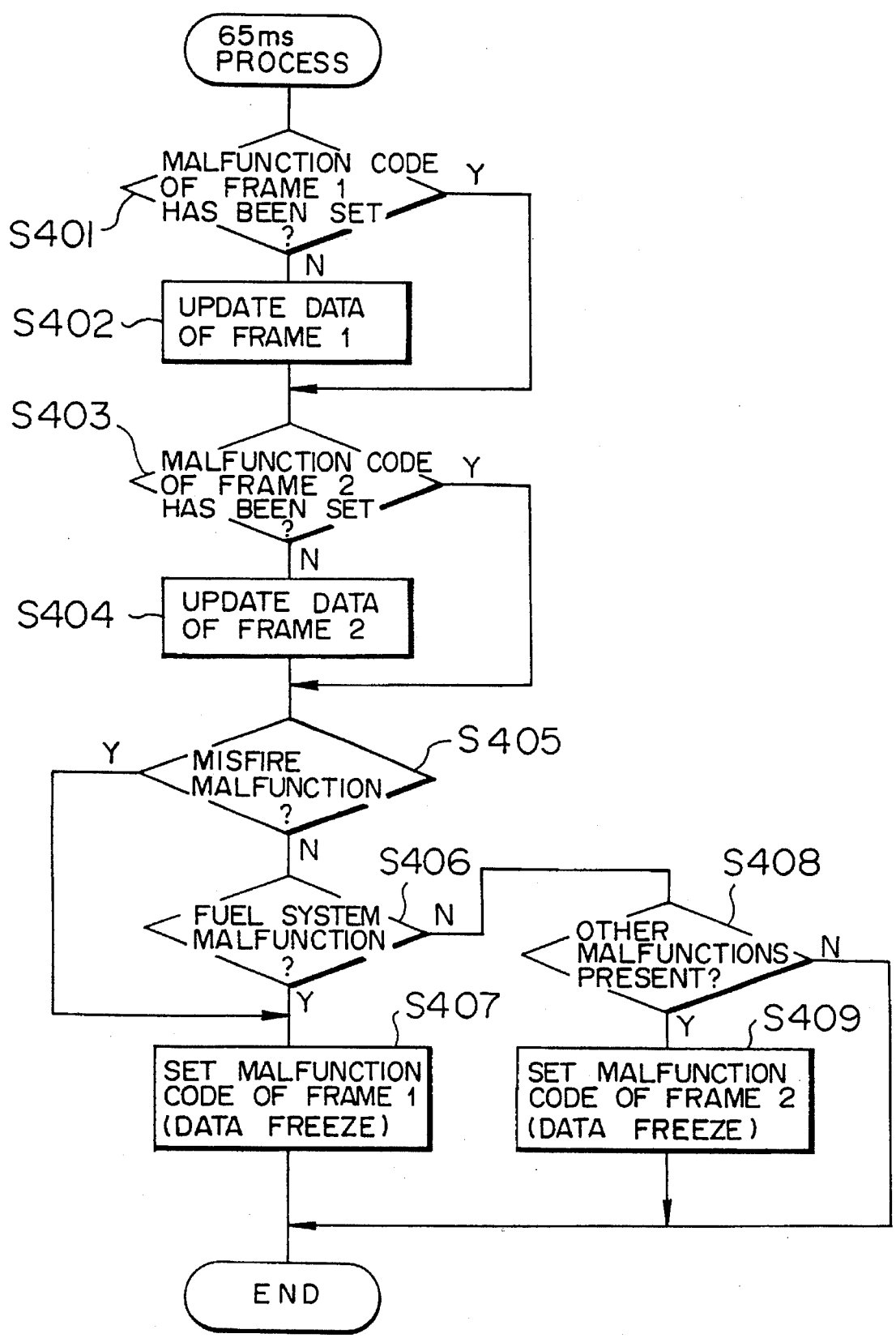
FIG. 8 is a program flowchart.

FIG. 8 shows a program for controlling writing in the standby RAM. The program is activated every 65 ms. In S401, a check is made to determine whether the malfunction code has been set in frame 1. If the code has not been set, the diagnostic data stored in the previous cycle is updated into the newly input diagnostic data (S402). When the malfunction code has been set, updating is inhibited, and the diagnostic data is frozen.

In S403, a check is made to determine whether the malfunction code of frame 2 has been set. If the code has not been set, the diagnostic data is updated (S404); if it has been set, the diagnostic data is not updated. In S405 and S406, a check is made for a misfire malfunction and a fuel system malfunction, respectively. If either of these malfunctions is confirmed, the malfunction code of frame 1 is set, so that the diagnostic data is frozen. If the malfunction is one other than one of the two above-described malfunctions, the malfunction code of frame 2 is set, so that the diagnostic data is frozen.

Figure 9:
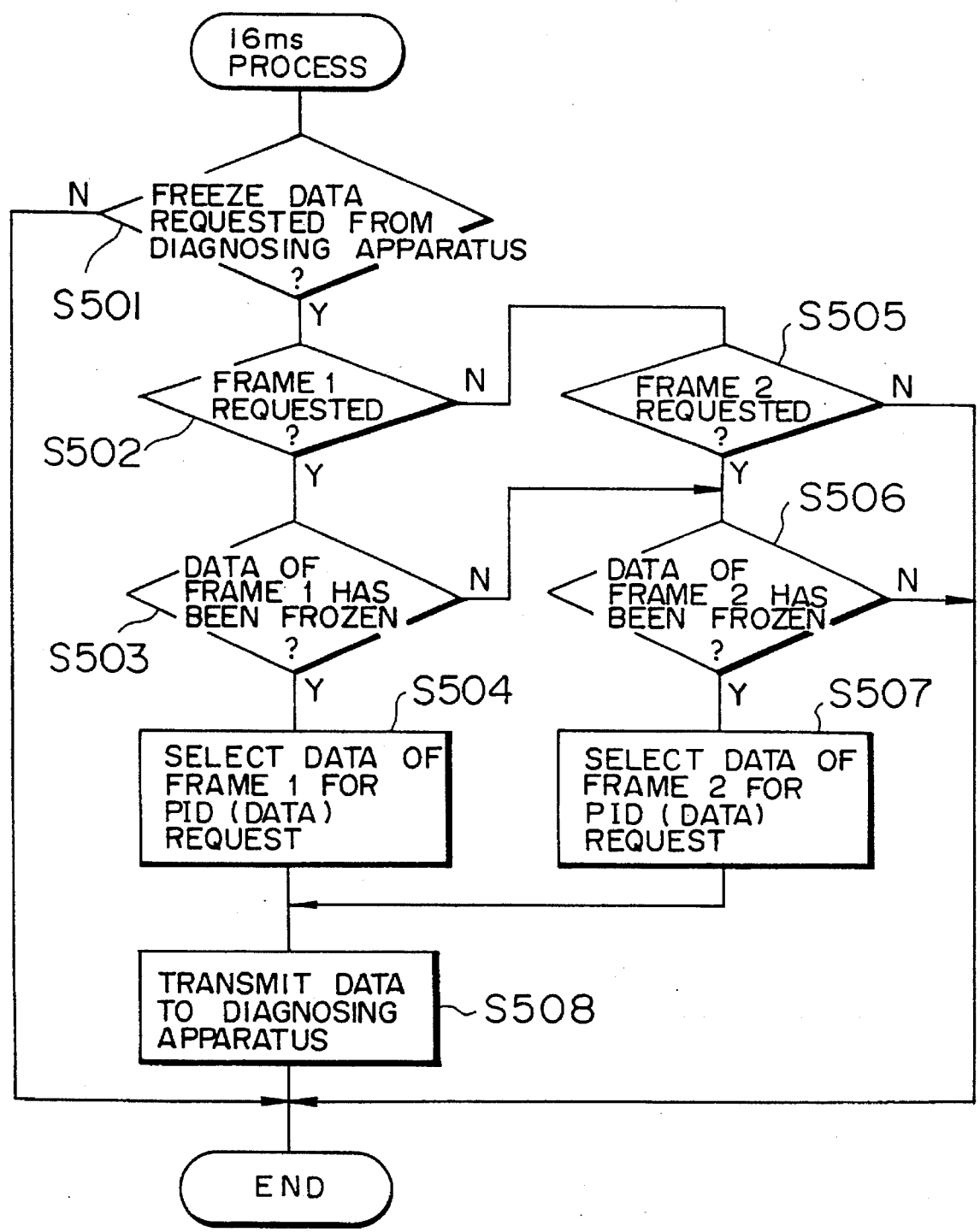
FIG. 9 is a program flowchart.
Figure 10:
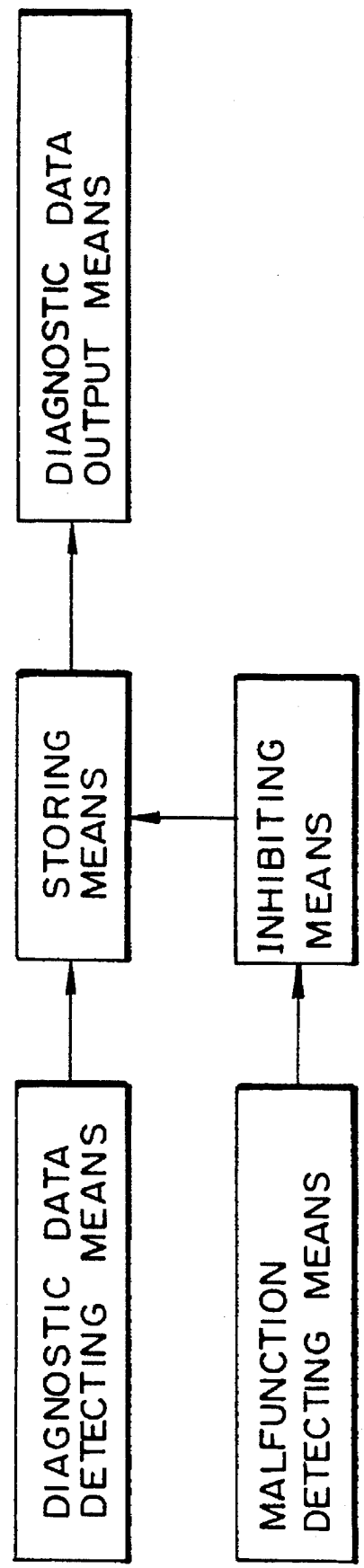
FIG. 10 is a conceptual block diagram of the construction of the present invention.

FIG. 9 shows a program for connecting a fault diagnosing apparatus after getting out of the motor vehicle and transmitting diagnostic data, which program is activated every 16 ms. In S501, a check is made to determine if frozen diagnostic data has been requested from the diagnosing apparatus. If the request is for frame 1, it is confirmed that the data has been frozen, and diagnostic data of frame 1 for proposition, integral and derivative control ("PID")is selected (S502, S503, S504). If the request is for frame 2, it is confirmed that the data has been frozen, and diagnostic data of frame 2 for PID is selected (S505, S506, S507). In the above case, the requested PID is one in which diagnostic data is requested in an ID format from the diagnosing apparatus. For example, PID1 is the number of rotations of the engine, and PID2 is the speed of the motor vehicle.

The selected diagnostic data is transmitted to the diagnosing apparatus (S508). If the request is not for a data request for frame 1 in S502, it is confirmed in S505 that it is a request for frame 2, and diagnostic data for the request PID of frame 2 is transmitted to the diagnosing apparatus in S505, S506, and S507.

As described above, because a priority is given to the malfunctions of the instruments installed in the motor vehicle, and because the frames, the number of which corresponds to the number of priorities, are secured in the standby RAM, even if a high priority malfunction is detected after a low priority malfunction is detected, diagnostic data necessary for analyzing the latter malfunction is secured instantly. Because it is not necessary to replace diagnostic data in such case, problem, such as, where completely different diagnostic data is stored in a part without being updated when the ignition switch is turned off while the diagnostic data is being replaced, do not occur.

Although in the above-described embodiment two types of priorities are used, of course the number of frames may be expanded so that three or more types of priorities are included.

Industrial Applicability

The present invention can be used as an apparatus for supporting the analysis of the cause of the malfunction by a method in which diagnostic data, such as the operating state of the internal combustion engine or the running state of the motor vehicle when a malfunction occurs in the instrument installed in the motor vehicle, is stored so that the state when the malfunction occurred can be reproduced on the basis of the above-described stored diagnostic data when a repair is made after the malfunction of the motor vehicle has occurred.

We claim:

1. A self-diagnosing apparatus for a vehicle, comprising:
    diagnostic data detecting means for detecting diagnostic data necessary for analyzing malfunctions of instruments installed in said vehicle;
    storing means, in which a first storage area and a second storage area are disposed so as to correspond respectively to high and low priorities of said malfunctions of said instruments installed in said vehicle so that first and second diagnostic data respectively corresponding to said high and low priorities of said malfunctions detected by said data detecting means are updated and stored in said first and second storage areas, respectively, and said stored contents of said first and second storage areas are held even when a power supply switch is in an off state;
    malfunction detecting means for detecting malfunctions of said instruments installed in said vehicle;
    inhibiting means for inhibiting updating and storing of said first and second diagnostic data corresponding to said high and low priorities of said malfunctions in said first and second storage areas of said storing means, respectively, when high and low priorities of said malfunctions of said instruments installed in said vehicle are detected by said malfunction detecting means, respectively; and
    diagnostic data output means for outputting said stored contents of said storing means from said first and second storage areas respectively corresponding to said high and low priorities of said malfunctions.

2. A self-diagnosing apparatus according to claim 1, wherein said malfunction detecting means detects at least a fuel system malfunction of an internal combustion engine as said high priority of malfunction.

3. A self-diagnosing apparatus according to claim 1, wherein said malfunction detecting means detects at least a misfire malfunction of an internal combustion engine as said high priority of malfunction.

4. A self-diagnosing apparatus according to claim 1, wherein each of said first and second storage areas of said storing means comprises a code storage area for storing a malfunction code indicating a type of malfunction, and a plurality of data storage areas for storing said diagnostic data.

5. A self-diagnosing apparatus according to claim 1, wherein said diagnostic data output means outputs diagnostic data to a fault diagnosing apparatus in distinction for each of said storage areas for each priority of malfunction in response to a request from said fault diagnosing apparatus connected to said self-diagnosing apparatus installed in said vehicle.

6. A self-diagnosing apparatus according to claim 1, wherein said diagnostic data output means outputs said stored contents of said high priority when said high priority of malfunction has been detected and when a request from a fault diagnosing apparatus connected to said self-diagnosing apparatus is one for said high priority of malfunction, and outputs said stored contents of said low priority when said high priority of malfunction has not been detected and said low priority of malfunction has been detected.

7. A self-diagnosing apparatus for a vehicle for detecting a malfunction of an instrument installed in said vehicle and for storing a state of each section of said vehicle when said malfunction has occurred, comprising:
    diagnostic data detecting means for detecting a plurality of diagnostic data necessary for analyzing said malfunction of said instrument installed in said vehicle;
    first malfunction detecting means for detecting said high priority malfunction of said instruments installed in said vehicle;
    first storing means for storing diagnostic data detecting by said diagnostic data detecting means when said high priority malfunction has occurred and said high priority malfunction has been detected by said first malfunction detecting means, and for holding said stored contents even if a power supply switch of said vehicle is in an off state;
    second malfunction detecting means for detecting a low priority malfunction detecting means for detecting a low priority malfunction of said instruments installed in said vehicle;
    second storing means for storing, independently of said first storing means, diagnostic data detected by said diagnostic data detecting means when said low priority malfunction has occurred and said low priority malfunction has been detected by said second malfunction detecting means, and for holding said store contents even said power supply switch of said vehicle is in an off state; and
    diagnostic data output means for outputting said stored contents of said first and second storing means.

8. A self-diagnosing apparatus according to claim 7, wherein said first malfunction detecting means detects at least a fuel system malfunction of an internal combustion engine as said high priority malfunction.

9. A self-diagnosing apparatus according to claim 7, wherein said first malfunction detecting means detects at least a misfire malfunction of an internal combustion engine as said high priority malfunction.

10. A self-diagnosing apparatus for motor vehicles according to claim 7, wherein said first and second storing means are formed separately in storage areas within a same storage element.

11. A self-diagnosing apparatus for motor vehicles according to claim 7, wherein said first and second storing means comprises a code storage area for storing a malfunction code indicating the type of a malfunction, and a plurality of data storage areas for storing said diagnostic data.

12. A self-diagnosing apparatus for motor vehicles according to claim 7, wherein said diagnostic data output means outputs diagnostic data to a fault diagnosing apparatus with said stored contents of said first and second storage areas being distinguished from one another in response to a request from a fault diagnosing apparatus connected to said self-diagnosing apparatus installed in said vehicle.

13. A self-diagnosing apparatus for motor vehicles according to claim 7, wherein said diagnostic data output means outputs said stored contents of said high priority malfunction when said high priority malfunction has been detected and when a request from a fault diagnosing apparatus connected to said self-diagnosing apparatus installed in said vehicle is for said high priority malfunction, and outputs said stored contents of a low priority when said high priority malfunction has not been detected and said low priority malfunction has been detected.

\* \* \* \* \*